3,720,736
PROCESS FOR THE SYNTHESIS OF
DIHYDROCARBONPHOSPHINATES
James E. Quick, Pittsburgh, Pa., and David L. Venezky, Fairfax County, Va., assignors to the United States of America as represented by the Secretary of the Navy
No Drawing. Filed Mar. 17, 1970, Ser. No. 20,391
Int. Cl. C07f 9/32
U.S. Cl. 260—973                                7 Claims

ABSTRACT OF THE DISCLOSURE

A process for the synthesis of a dihydrocarbonphosphinate wherein a dihydrocarbonhalophosphine is oxidized in the presence of a dihydrocarbon sulfoxide, such as dimethylsulfoxide, and the reaction mixture thereof is reacted with an appropriate alcohol to form the desired ester.

BACKGROUND OF THE INVENTION

This invention relates generally to a process for the synthesis of organic phosphinates and more particularly to a process for the synthesis of esters of dihydrocarbonphosphinic acids.

Recent interest in polymeric metal phosphinates, which have a wide versatility of uses, such as pigments for paints, rust inhibitors, fabricating material for various shaped plastic-like articles, etc. has created a need for an improved synthesis of certain dihydrocarbonphosphinates which are useful, among other uses, as intermediates for making these polymeric metal phosphinates.

In the past, preparative procedures for esters of dihydrocarbonphosphinic acids, besides giving low yields of desired product, involved timely, tedious and costly reaction manipulation procedures.

SUMMARY OF THE INVENTION

Accordingly, it is one object of the present invention to provide a novel process for the synthesis of esters of dihydrocarbonphosphinic acids.

Another object of this invention is to provide a process for the synthesis of esters of dihydrocarbonphosphinic acids which is simple and economical.

A still further object of the present invention is to provide a process for the synthesis of esters of dihydrocarbonphosphinic acids which provides good yields of the desired product.

These and other objects are achieved herein by a process whereby a dihydrocarbonhalophosphine is oxidized and the intermediate product thereof, without isolation or purification, is converted to the desired ester by contact with an appropriate alcohol.

DESCRIPTION OF THE PREFERRED EMBODIMENTS

According to the process of the present invention, a dihydrocarbonhalophosphine is dissolved in an appropriate inert halogenated solvent, such as, for example, carbon tetrachloride, chloroform, tetrachloroethylene or the like, and oxidized by heating under reflux in the presence of a dialkyl or diarylsulfoxide.

Dihydrocarbonhalophosphines which are applicable herein as starting materials are represented by the general formula RR'PX wherein R and R' may be the same or different and are, for example, alkyl, aryl, substituted alkyl such as aryl-alkyl, halo-alkyl and nitro-alkyl, substituted aryl such as alkyl-aryl, halo-aryl, nitro-aryl, and amino-aryl, and X is halogen (e.g. Cl, Br, I, F,). Thus, some of these dihydrocarbonhalophosphines are specifically, for example, dimethylchlorophosphine,
diethylchlorophosphine,
di-n-butyl and di-iso-butyl-chlorophosphine,
diethylbromophosphine,
dipentylchlorophosphine,
dicyclohexylchlorophosphine,
di(1-chloroethyl)-chlorophosphine,
1,1'-nitrodiethylchlorophosphine,
diphenylchlorophosphine,
diphenylbromophosphine,
ditolylchlorophosphine,
di(2,3,4,5,6-fluorophenyl)chlorophosphine,
phenylmethylchlorophosphine,
dibenzylchlorophosphine, etc.

It should be well noted that these dihydrocarbonhalophosphine starting materials are either easily and cheaply preparable by known procedures or are very cheaply commercially available.

Among the sulfoxides which may be employed herein as oxidizing agents are included for example, dimethylsulfoxide, diethylsulfoxide, dipropylsulfoxide, dibutylsulfoxide, diphenylsulfoxide. It is preferable, however, that a low weight sulfoxide such as dimethyl or diethyl be utilized so that the byproduct sulfide compound be volatile and thereby more readily removed from the system.

It is further preferred, that the quantity of the dihydrocarbonhalophosphine starting material and particular oxidizing agent employed be on an equal molar ratio, although an excess of the phosphine material may also be used. Any excess of the sulfoxide oxidizing agent is not particularly desirable, since it is preferred that all of this material be converted to its analogous volatile sulfide and completely removed from the system due to the ill aroma of these materials.

After oxidiation has been completed, which is usually from about 1 to 4 hours, the volatile products, i.e., the appropriately formed dialkyl or diarylsulfide, for example, dimethylsulfide, and hydrogen chloride may be removed from the system, such as by reduced pressure or other conventional means. Although, it is not certain, it is suggested that the major portion of the oxidized intermediate reaction mixture is the acid chloride of general formula

wherein R, R' and X have the same significance as stated above.

Without any necessity to isolate or purify this resultant intermediate reaction mixture in order to obtain high yields and pure products, an excess of the stoichiometric amount of an alcohol is added thereto (in other words the alcohol is added to the in situ intermediate reaction mixture) and stirred at room temperature until esterification has been completed, usually from about 1–3 hours. About a 10 percent excess of the alcohol is employed merely to assure complete esterification, however, a stoichiometric amount may be also used if desired. Furthermore, although not necessary for good yields, a base, such as a tertiary amine, may or may not be utilized in this esterification step.

Any aliphatic alcohols, the choice of which is obviously dependent upon the ester product desired, may be employed with the scope of the present process. Preferably, aliphatic alcohols from 1 to 12 carbons are used. Among others, some of these are methanol, ethanol, propanol, isopropanol, n-butanol, isobutyl alcohol, n-decyl alcohol and isomers thereof, n-dodecyl alcohol and isomers thereof, etc.

After esterification has been completed, the solvent may be removed by conventional techniques, for example, by flash evaporation and the appropriate dihydrocarbonphosphinic ester product is thereby isolated.

The crude product may be purified by a number of ordinary means the optimum technique being dependent upon its particular characteristics. For example, the product ethyl diphenylphosphinate may be purified by vacuum distillation, while the products isopropyl or n-butyl diphenylphosphinate are conveniently purified by precipitating the esters from acetone solutions by the addition of water. Obviously, other conventional recrystallization techniques are applicable herein.

The dihydrocarbonphosphinic esters prepared by the process of the present invention are useful for a variety of purposes. Besides serving as intermediates in the prepration of poly-(metal phosphinates) they are useful as stabilizing additives to lubrication oils and hydraulic oils used at high temperatures and also among other known uses as additives to fuels.

The general nature of the invention having been set forth, the following example and tables are presented as specific illustrations thereof. It will be understood that the invention is not limited to this example but is susceptible to various modifications that will be recognized by one of ordinary skill in the art.

EXAMPLE 1

The general method used to prepare the esters of this invention is illustrated by the following example.

Ethyl diphenylphosphinate: In a flask fitted with a dry nitrogen bubbler and containing a magnetic stirrer, diphenylchlorophosphine (18.4 ml., 0.10 mole) was diluted with 50 ml. of dried carbon tetrachloride. After the slow addition of dimethyl sulfoxide (7.3 ml., 0.10 mole) the reaction mixture was refluxed three hours. The volatile product, dimethyl sulfide, was collected in a trap cooled to liquid nitrogen temperature. When the reaction had cooled to room temperature, absolute ethanol (6.2 ml., 0.11 mole) was slowly added; the solution was stirred at room temperature for approximately two hours. The solvent and other remaining volatiles were removed by flash evaporation. The crude ethyl diphenylphosphinate was isolated as an oil (23.8 g. 94% yield) and was purified by vacuum distillation at 195-200° C. under 2.5 torr of pressure. The clear liquid distillate crystallized when the purified ester was transferred to a bottle.

The analogous methyl, isopropyl and n-butyl esters of diphenylphosphinic acid were prepared in the same way. Although the methyl ester was purified by vacuum distillation, the isopropyl and n-butyl esters were more conveniently purified by precipitating the esters from acetone solutions by the addition of water. The purified esters do not appear to hydrolyze readily in the presence of water at room temperature.

Table I, below, lists some of the esters prepared by the process of the present invention. Among other reasons, the high yields reported are attributed to the minimum handling of the reactive intermediate within the process.

Table II below lists the infrared and nmr spectra data of the esters.

TABLE II.—INFRARED DATA FOR ALKYL DIPHENYLE PHOSPHINATES $$(C_6H_5)_2\overset{\overset{O}{\|}}{P}OR$$

| R | Infrared frequencies (cm.−1) | |
|---|---|---|
|  | P=O | P—O—C |
| CH₃ | 1,228 | ¹ 1,030 |
| CH₃CH₂— | 1,227 | 1,031 |
| (CH₃)₂CH— | 1,218 | 980 |
| CH₃(CH₂)₃— | 1,220 | 1,033 |

¹ Doublet.

As will be evident to those skilled in the art, various modifications can be made in light of the foregoing disclosure without departing from the scope and spirit thereof.

What is claimed as new and desired to be secured by Letters Patent of the United States is:

1. A process for the synthesis of phosphinic acid esters which comprises:

contacting a phosphine compound having the general formula RR'PX wherein R and R' may be the same or different and are selected from the group consisting of alkyl, aryl, substituted alkyl and substituted aryl, and X is a halogen, with a sulfoxide compound selected from the group consisting of dimethyl sulfoxide, diethyl sulfoxide, dipropyl sulfoxide, dibutyl sulfoxide and diphenyl sulfoxide;

refluxing the resulting mixture until oxidation is complete;

contacting the reaction mixture thereof with an alcohol selected from the group selected from methanol, ethanol, propanol, isopropanol, n-butanol, isobutyl alcohol, n-decyl alcohol and isomers thereof, and n-dodecyl alcohol and isomers thereof;

allowing said alcohol to react with said reaction mixture at room temperature until esterification of said alcohol is complete; and separating the esterification product thereof.

2. The process of claim 1 wherein said phosphine compound is dissolved in an inert halogenated solvent.

3. The process of claim 1 wherein said phosphine compound is a diarylphosphine.

4. The process of claim 1 wherein said phosphine compound and said sulfoxide compound are present either in an equal molar ratio or in a ratio such that there is a molar excess of said phosphine compound and said alcohol is reacted in excess of the stoichiometric quantity.

5. The process of claim 1 wherein the refluxing step is about 1 to 4 hours and the reacting step at room temperature is from about 1–3 hours.

6. The process of claim 3 wherein said diarylchlorophosphine and said sulfoxide compound are reacted in

TABLE I.—ESTERS OF DIPHENYLPHOSPHINIC ACID, (C₆H₅)₂P(O)OR

| R | Crude yield, percent | M.P.ª (° C.) | B.P.ª (° C.) | Torr | D¹¹ ᵇ | Analyses (percent) | | | | | |
|---|---|---|---|---|---|---|---|---|---|---|---|
|  |  |  |  |  |  | Calculated | | | Found | | |
|  |  |  |  |  |  | C | H | P | C | H | P |
| CH₃— | 74 | 59–61 | 180–90 | 2.5 | 1.5846 | 67.24 | 5.64 | 13.34 | 67.31 | 5.71 | 13.31 |
| C₂H₅— | 94 | 43.5 | 195–200 | 2.5 | 1.5716 | 68.29 | 6.14 | 12.58 | 68.51 | 6.34 | 12.36 |
| (CH₃)₂CH— | 87 | 95–6 |  |  |  | 69.22 | 6.58 | 11.90 | 68.75 | 6.53 | 11.92 |
| CH₃(CH₂)₃— | 96 | 92.5–3.5 |  |  |  | 70.06 | 6.98 | 11.29 | 70.36 | 7.08 | 11.02 |

ª All temperatures are uncorrected.
ᵇ Obtained on the oils.

approximately equal mole proportions and said aliphatic alcohol is reacted in excess of the stoichiometric quantity.

7. The process of claim 6 wherein said diarylchlorophosphine is diphenylchlorophosphine and said sulfoxide compound is dimethylsulfoxide.

References Cited
UNITED STATES PATENTS
2,653,161  9/1953  Ballard et al. _____ 260—973 X
3,092,650  6/1963  McBride et al. _____ 260—973

OTHER REFERENCES
Amonoo-Meizer, J. Chem. Soc., August 1965, pp. 4296–4300.

LEWIS GOTTS, Primary Examiner
A. H. HUTTO, Assistant Examiner

U.S. Cl. X.R.
260—961, 985